US011829850B2

(12) United States Patent
Beaty et al.

(10) Patent No.: US 11,829,850 B2
(45) Date of Patent: Nov. 28, 2023

(54) REDUCING COMPLEXITY OF IMPLEMENTING MACHINE LEARNING MODELS IN SOFTWARE SYSTEMS

(71) Applicant: RedCritter Corp., Flower Mound, TX (US)

(72) Inventors: Robert M. Beaty, Flower Mound, TX (US); Randy M. Whelan, Coppell, TX (US); Erika D. Lambert, Flower Mound, TX (US); David R. Jenness, Flower Mound, TX (US); Dan D. Hoffman, Flower Mound, TX (US); James L. Rockett, Jr., Carrollton, TX (US)

(73) Assignee: RedCritter Corp., Flower Mound, TX (US)

( * ) Notice: Subject to any disclaimer, the term of this patent is extended or adjusted under 35 U.S.C. 154(b) by 921 days.

(21) Appl. No.: 16/526,812

(22) Filed: Jul. 30, 2019

(65) Prior Publication Data
US 2021/0035012 A1    Feb. 4, 2021

(51) Int. Cl.
*G06N 20/00*    (2019.01)

(52) U.S. Cl.
CPC .................................. *G06N 20/00* (2019.01)

(58) Field of Classification Search
CPC .................................. G06F 8/60; G06N 20/00
See application file for complete search history.

(56) References Cited

U.S. PATENT DOCUMENTS

| | | | |
|---|---|---|---|
| 11,392,855 B1* | 7/2022 | Murakonda | G06N 5/01 |
| 2010/0316986 A1* | 12/2010 | de la Chica | G09B 5/00 |
| | | | 434/362 |
| 2013/0022953 A1* | 1/2013 | van der Linden | G09B 7/02 |
| | | | 434/322 |
| 2016/0300156 A1* | 10/2016 | Bowers | G06F 16/2465 |
| 2017/0098380 A1* | 4/2017 | Mihai | G09B 7/04 |
| 2017/0185921 A1* | 6/2017 | Zhang | G06N 20/00 |
| 2019/0050756 A1* | 2/2019 | Dirac | G06N 20/00 |
| 2020/0051460 A1* | 2/2020 | Bedor | G09B 19/22 |
| 2020/0302811 A1* | 9/2020 | Beaty | G06F 17/11 |
| 2020/0394566 A1* | 12/2020 | Martin | G06F 16/211 |
| 2022/0091837 A1* | 3/2022 | Chai | G06F 8/36 |
| 2022/0198336 A1* | 6/2022 | Puente Pestaña | G06N 20/00 |

* cited by examiner

*Primary Examiner* — Sherief Badawi
*Assistant Examiner* — William P Bartlett
(74) *Attorney, Agent, or Firm* — Kirton McConkie; Brian Tucker

(57) ABSTRACT

The complexity of implementing machine learning models in software systems can be reduced using an abstraction system. The abstraction system functions as an intermediary between a machine learning service and a client process. The abstraction system provides a unified API by which the client process can submit client requests targeting a machine learning model and also abstracts the complexity of configuring model requests in the appropriate form for a particular machine learning service and model. The abstraction system also provides a standard mechanism for delivering results to the client process in an actionable format and for tracking outcomes of any actions that the results trigger. The abstraction system therefore greatly simplifies the process of employing machine learning models within a software system.

20 Claims, 18 Drawing Sheets

Browser

Model Meta File Editor  [Save]

Model Details ∨

| Model GUID | ModelGUID1 | ID for the model meta file |
|---|---|---|
| Name | Flashcard Practice | Name for the model meta file |
| ML ID | FlashcardPractice | ID for the corresponding machine learning model |
| Description | Auto generate flashcard practice sets for users of an assignment. | |
| Certainty | 0 | Threshold between 0 and 100 that must be met for output |
| ExpDays | 14 | Number of days before output expires |
| Enabled | ☑ | |
| Deleted | ☐ | |

Inputs (2) > [UserID ⊗] [AssignmentID ⊗]

Variables (2) > [Weights ⊗] [LearningStandardID ⊗]

Converters (2) >

Outputs (3) > [NeedsFlashcardPrep ⊗] [ExtraFlashcardPrep ⊗] [NeedsFlashcardPrepNotify ⊗]

*FIG. 3B*

Model Meta File Editor [ Save ]

Model Details >

Inputs (2) > [ UserID ⊗ ] [ AssignmentID ⊗ ]

Variables (2) ∨

⊗
Name [ Weights ]
Type [ String ∨ ] Value [        ]
OutputField [ 3 ]
Nullable ☐

⊗
Name [ LearningStandardID ]
Type [ Int32 ∨ ] Value [        ]
OutputField [ 2 ]
Nullable ☐

Converters (2) >

Outputs (3) > [ NeedsFlashcardPrep ⊗ ] [ ExtraFlashcardPrep ⊗ ] [ NeedsFlashcardPrepNotify ⊗ ]

*FIG. 3D*

Browser

Model Meta File Editor [Save]

Model Details >
Inputs (2) >  [UserID ⊗] [AssignmentID ⊗]
Variables (2) >  [Weights ⊗] [LearningStandardID ⊗]
Converters (2) >
Outputs (3) ∨

---

Name
[NeedsFlashcardPrep]

Channel
[Suggestion ∨]

Title
[Let's Practice Flashcards]

Priority
[High ∨]

Icon ID
[1]

Deliver to:
☐ Admin
☐ Teacher
☑ Student
☐ Parent

Display on:
☐ Site
☐ AppDomain/User
☑ AppDomain
☐ User

Conditions
[$(Outcome)] [== ∨] [True] ⊗
[Add Condition]

JSON
{"Output" : "NeedsFlashcardPrep",
"WeightsJSON" : $(VAR_Weights),
"LearningStandardID" : $(VAR_LearningStandardID),
...}

HTML
[...]

Script
[...]

Required Add-ins
[...]

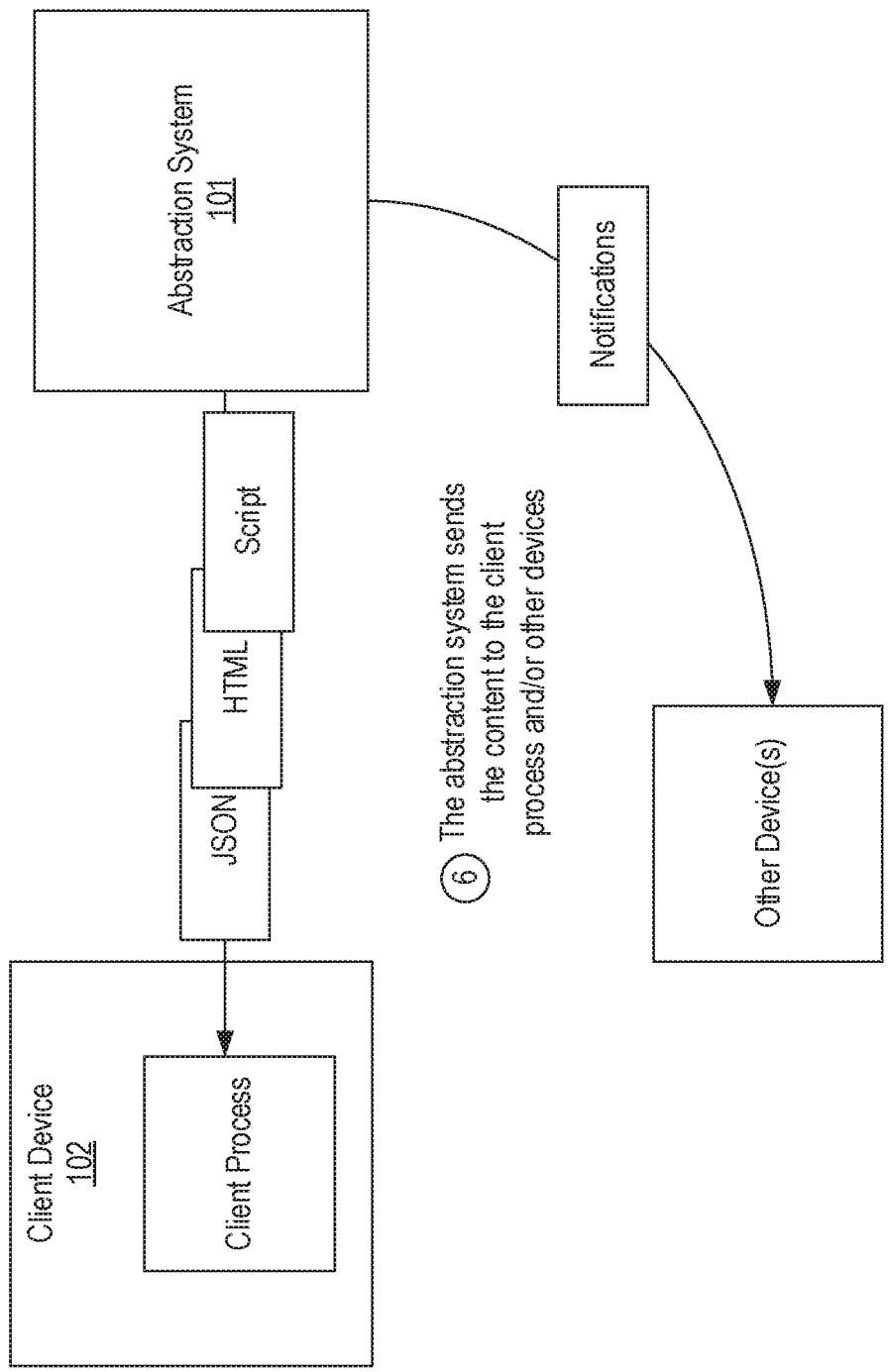

REDUCING COMPLEXITY OF IMPLEMENTING MACHINE LEARNING MODELS IN SOFTWARE SYSTEMS

CROSS-REFERENCE TO RELATED APPLICATIONS

N/A

BACKGROUND

Artificial intelligence, including machine learning, is oftentimes used in software systems. For example, Microsoft's Azure, Amazon's AWS, Google Cloud and other cloud providers each offer machine learning services that enable their customers to employ machine learning models within their software solutions. For purposes of this specification and the claims, the term "machine learning service" should be construed as a service (whether or not provided as part of a cloud) that allows individuals to build, train and deploy a machine learning model. The term "machine learning model" should be construed in accordance with its customary meaning.

When a developer desires to employ a machine learning model within a software system, the developer will oftentimes employ a third party machine learning service. In some cases, the developer may use the third party machine learning service to both create and use a custom machine learning model. In other cases, the developer may simply use an existing machine learning model that the third party machine learning service provides. Even if a developer only uses an existing machine learning model, it is still quite difficult and tedious to utilize the machine learning model within a software system.

As one example, to utilize a machine learning model, the developer must write custom code that creates requests that meet the requirements of the machine learning service and the specific machine learning model. For example, to utilize a machine learning model that predicts a value of a field in a record, the developer must develop code that creates records that include all of the fields that the machine learning model requires and that formats the record in the manner expected. In such cases, it may also be necessary to develop code that populates various fields of the record by accessing persistent data stores.

Furthermore, if the software system is implemented as a client/server system where the client originates the request to be submitted to the machine learning service, it is typically necessary to develop a server-side application programming interface (API) through which the client routes the request. In addition to being configured to receive requests from the client, such APIs will also need to be configured as described in the previous paragraph to interface with the corresponding machine learning service, create and format a request suitable to be provided to the machine learning service and the particular machine learning model. If the software system employs multiple machine learning models and/or multiple machine learning services, and given that each third party machine learning service likely requires different techniques for accessing a machine learning model, configuring each API can be very burdensome.

It is also typically necessary to develop code to handle the result generated by the machine learning model. Yet, there is no standard way of receiving or responding to such results. For example, it is oftentimes desired to take some action based on the result and then track the outcome of such action. In these cases, the developer will likely be required to develop significant amounts of custom code to evaluate the various types of results, to perform various types of actions based on the results and to track outcomes of the actions. Simply put, a developer that desires to use machine learning models in a software system will face the difficult and tedious task of writing custom code.

BRIEF SUMMARY

The present invention extends to methods, systems and computer program products for reducing the complexity of implementing machine learning models in software systems. An abstraction system functions as an intermediary between a machine learning service and a client process. The abstraction system provides a unified API by which the client process can submit client requests targeting a machine learning model and also abstracts the complexity of configuring model requests in the appropriate form for a particular machine learning service and model. The abstraction system also provides a standard mechanism for delivering results to the client process in an actionable format and for tracking outcomes of any actions that the results trigger. The abstraction system therefore greatly simplifies the process of employing machine learning models within software systems.

In some embodiments, the present invention is implemented by an abstraction system as a method for reducing the complexity of using a machine learning model in a client process. The abstraction system can maintain a model meta file storage that stores a plurality of model meta files. Each model meta file corresponds with a particular machine learning model and defines zero or more input parameters, zero or more variables, zero or more converters and zero or more outputs. The abstraction system can receive, from a client process, a first client request that identifies a first model meta file of the plurality of model meta files. The first model meta file corresponds with a first machine learning model. The abstraction system accesses the model meta file storage to retrieve the first model meta file and uses the first model meta file to create a first model request. The abstraction system then submits the first model request to a first machine learning service to cause the first machine learning service to evaluate the first model request against the first machine learning model. The abstraction system obtains a first model result from the evaluation of the first model request and compares the first model result to one or more conditions of a first output defined in the first model meta file. Upon determining that the first model result matches the one or more conditions of the first output, the abstraction system delivers content of the first output to the client process.

In other embodiments, the present invention is implemented by an abstraction system as a method for reducing the complexity of using a machine learning model in a client process. The abstraction system receives, from a client process, a first client request that identifies a first model meta file that corresponds with a first machine learning model and that includes one or more values for one or more input parameters. The first model meta file defines the one or more input parameters, one or more variables, one or more converters and one or more outputs. The abstraction system employs the one or more converters defined in the first model meta file to determine one or more values for the one or more variables and creates a first model request that includes at least one of the one or more values for the one or more input parameters that were included in the first client request and that includes at least one of the one or more values for the one or more variables. The abstraction system submits the first model request to a first machine learning service to cause the first machine learning service to evaluate the first model request against the first machine learning model. The abstraction system obtains a first model result from the evaluation of the first model request and compares the first model result to one or more conditions of a first output defined in the first model meta file. Upon determining that the first model result matches the one or more conditions of the first output, the abstraction system delivers content of the first output to the client process.

In other embodiments, the present invention is implemented as computer storage media storing computer executable instructions which when executed implement a method for reducing the complexity of using a machine learning model in a client process. The method includes: maintaining a model meta file storage that stores a plurality of model meta files, each model meta file corresponding with a particular machine learning model, each model meta file defining zero or more input parameters, zero or more variables, zero or more converters and zero or more outputs; and providing an application programming interface (API) by which the client process can submit a client request that identifies one of the plurality of model meta files. In in response to receiving a client request via the API, the method also includes: determining which of the plurality of model meta files the client request identifies; using the identified model meta file to create a model request; submitting the model request to a machine learning service to cause the machine learning service to evaluate the model request against the particular machine learning model with which the identified model meta file corresponds; obtaining a model result from the evaluation of the model request; comparing the model result to one or more conditions of an output defined in the identified model meta file; and upon determining that the model result matches the one or more conditions of the output, delivering content of the output to the client process.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A-3G illustrate how the abstraction system can enable a developer to create, update or view a model meta file; and FIGS. 4A-4I illustrate how the abstraction system uses a model meta file to hide the complexity of using a machine learning model from the client process.

DETAILED DESCRIPTION

Figure 1:
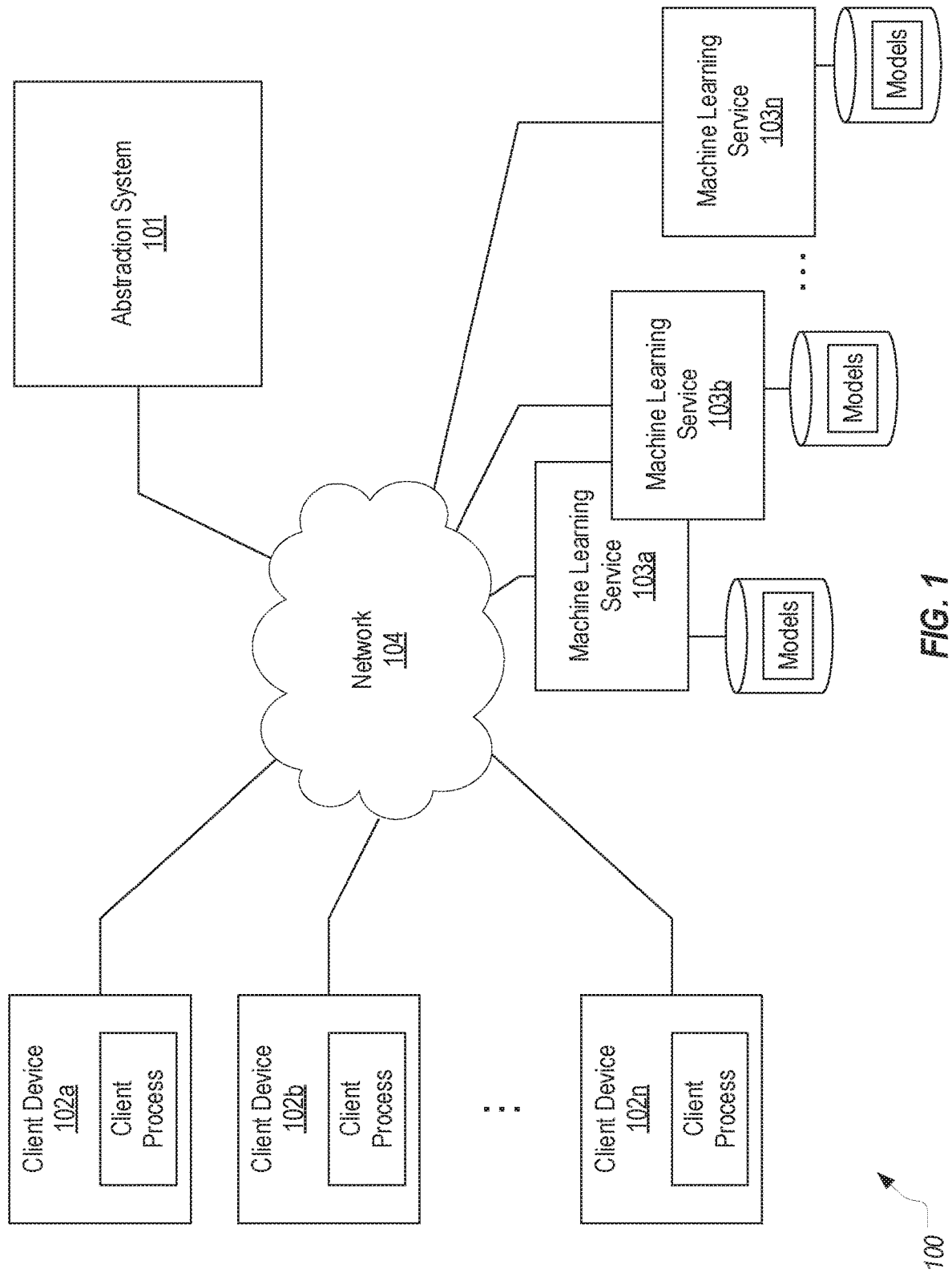
FIG. 1 illustrates an example computing environment in which the present invention may be implemented.

FIG. 1 illustrates an example computing environment 100 in which embodiments of the present invention may be implemented. Computing environment 100 includes an abstraction system 101, any number of client devices 102a-102n each of which includes a client process, and any number of machine learning services 103a-103n. Abstraction system 101, client devices 102a-102n and machine learning services 103a-103n are shown as being interconnected via network 104 which may typically represent the internet.

Abstraction system 101 may be implemented in any server environment including a cloud environment. Client devices 102a-102n (generally client device(s) 102) can represent any of the many different types of computing devices that are capable of accessing abstraction system 101 via network 104 including, for example, desktops, laptops, thin clients, smart phones, etc. The term "client process" will be used to generally represent the client-side software that accesses a machine learning model via abstraction system 101. This is in contrast to the "model meta file editor" which may also be client-side software but is used to create, view and/or edit model meta files as described below.

Machine learning services 103a-103n (generally machine learning service(s) 103) can typically represent the machine learning solutions provided with Azure, AWS, Google Cloud or any other cloud provider, but may also represent any other machine learning services that may be accessible via network 104. Each machine learning service 103 can maintain and provide access to machine learning models. In typical embodiments, the machine learning models employed in implementations of the present invention will have been created by the provider of abstraction system 101. However, the machine learning models could have been created by any individual and in any suitable way. The present invention should therefore not be limited to any particular type of machine learning model or machine learning service. Of importance is the fact that at least one machine learning model exists and that abstraction system 101 provides a simplified way for at least one client process to utilize the machine learning model.

Figure 2:
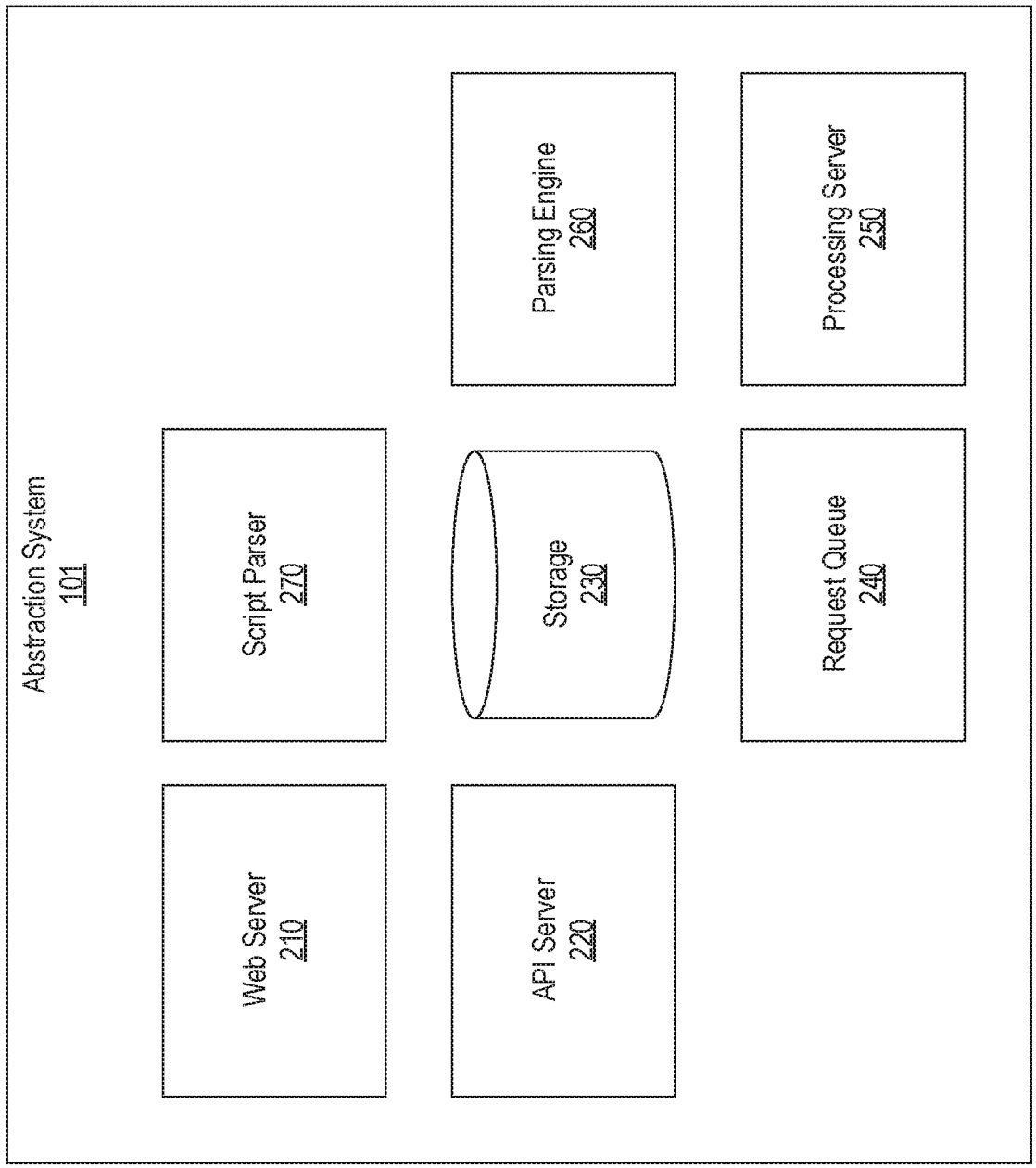
FIG. 2 illustrates an example architecture of an abstraction system that functions as an intermediary between client processes and machine learning services that provide machine learning models.

FIG. 2 illustrates various components that abstraction system 101 may include in embodiments of the present invention. As an overview, abstraction system 101 may include a web server 210 that functions to provide one or more webpages (or other web-based content) which include or implement a model meta file editor as described below. In cases where the model meta file editor is provided as part of a stand-alone application, web server 210 may not be necessary. In any case, the manner in which the model meta file editor is obtained or accessed on any client device 102 is not essential to the invention.

Abstraction system 101 also includes an API server 220 which provides the API(s) by which the client-side software (e.g., the client processes and the model meta file editor) interact with the abstraction system 101. As described below, these interactions can include the model meta file editor's communications for creating, editing and viewing model meta files and the client processes' communications for submitting "client requests" for utilizing a machine learning model. API server 220 can also be configured to validate client requests using model meta files that are stored in storage 230. Once a client request is validated, API server 220 may store the client request in request queue 240.

Abstraction system 101 also includes a processing server 250 which is configured to create "model requests" from content of the client requests. Processing server 250 can employ the model meta files and parsing engine 260 for this purpose. Processing server 250 is also configured to interface with machine learning services 103 to submit the model requests and to receive corresponding model results. Upon receiving model results, processing server 250 can employ the model meta files to determine any outputs that the model results should generate. Processing server 250 may then employ script parser 270 to create the appropriate output and may employ API server 220 to deliver the output or take some other action.

FIGS. 3A-3G represent how abstraction system 101 can enable a developer to use the model meta file editor to create, view and edit a model meta file. A model meta file defines the information that abstraction system 101 should employ to create a model request from a client request and to determine what, if any, output should be generated from model results. As such, a developer creates a model meta file for a particular machine learning model to enable client processes to submit client requests pertaining to the particular machine learning model. Importantly, the model meta file and the functionality that abstraction system 101 performs using the model meta file greatly simplify the process of submitting client requests and the process of receiving corresponding results. Accordingly, abstraction system 101 greatly reduces the amount of custom code that would otherwise need to be developed to utilize a machine learning model.

Figure 3A:
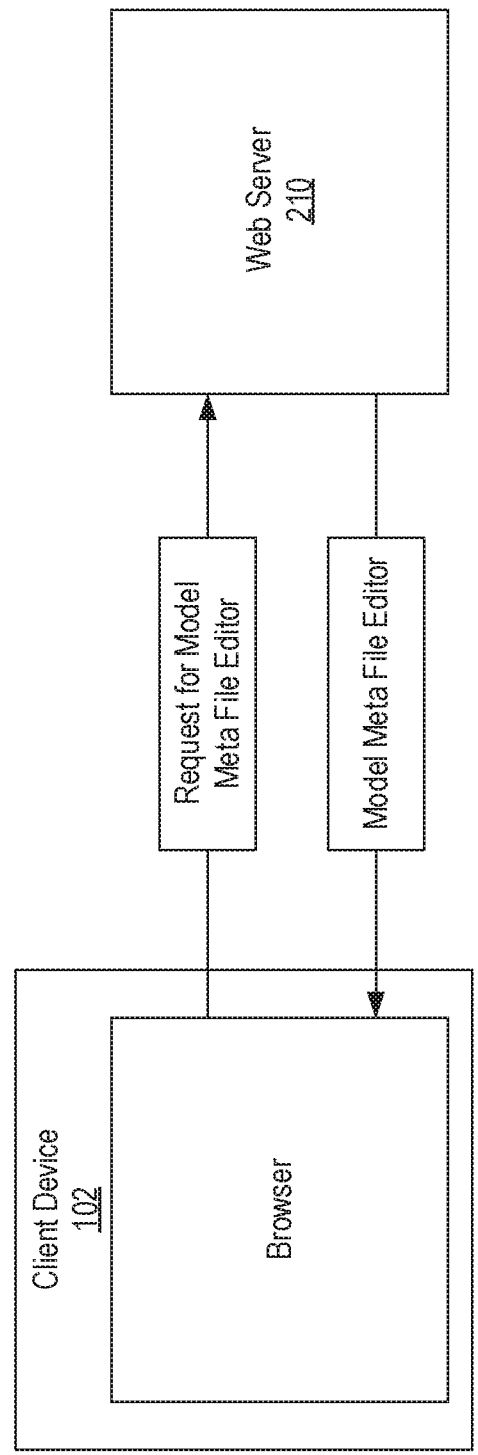

Turning to FIG. 3A, it is assumed that the developer is employing a browser on client device 102 to access a model meta file editor. Accordingly, the developer can employ the browser to submit a request to web server 210 for the model meta file editor (e.g., by navigating to a particular website where the model meta file editor is hosted). Alternatively, client device 102 could include a dedicated application that provides the model meta file editor.

FIGS. 3B-3F provide an example where the model meta file editor is configured as a web-based form that solicits input from the developer to define details and various parameters for the model meta file to be created or edited. In some embodiments, there are four categories of parameters within a model meta file: inputs, variables, converters and outputs. The model meta file represented in FIGS. 3B-3F is simplified for illustrative purposes and is assumed to correspond to a machine learning model that predicts whether a student needs more practice on subject matter that is covered in an assignment that has been assigned to the student. It is also assumed that the model meta file is configured to generate flashcard sets based on the results of the machine learning model. It is to be understood, however, that abstraction system 101 enables a developer to create complex model meta files containing many different inputs, variables, converters, and outputs.

FIG. 3B illustrates the model meta file editor when the model details section is expanded. The model details section allows the developer to define/update general information about the model meta file. For example, each model meta file can define a unique identifier, a name and a description for the model meta file as well as a machine learning model identifier (ML ID) which associates the model meta file with a particular machine learning model. In this example, it is assumed that the developer is creating a model meta file having a model GUID of ModelGUID1, a name of "Flashcard Practice" and a description of "Auto generate flashcard practice sets for users of an assignment." It is also assumed that this model meta file is intended to be associated with the machine learning model having an ML ID of FlashcardPractice. As mentioned above, in typical embodiments, this machine learning model will have already been created with a machine learning service, and therefore the ML ID can be set to the identifier that is used by the machine learning service to uniquely identify the machine learning model.

The model details section also allows the developer to specify a certainty value which may be in the form of a number between 0 and 100. This certainty value functions as a threshold that must be met when the machine learning model provides a result or else output (e.g., an action) will not be generated for that result. The ExpDays field allows the developer to define the number of days after which any output will expire. In this example, it is assumed that the developer wants any output generated for a result to remain valid for 14 days. Finally, the enabled and deleted checkboxes allow the developer to enable and delete the model meta file respectively. When the model meta file is enabled, abstraction system 101 will enable client requests pertaining to the associated machine learning model to be submitted (e.g., API server 220 will accept and validate client requests that are associated with enabled model meta files).

Figure 3C:
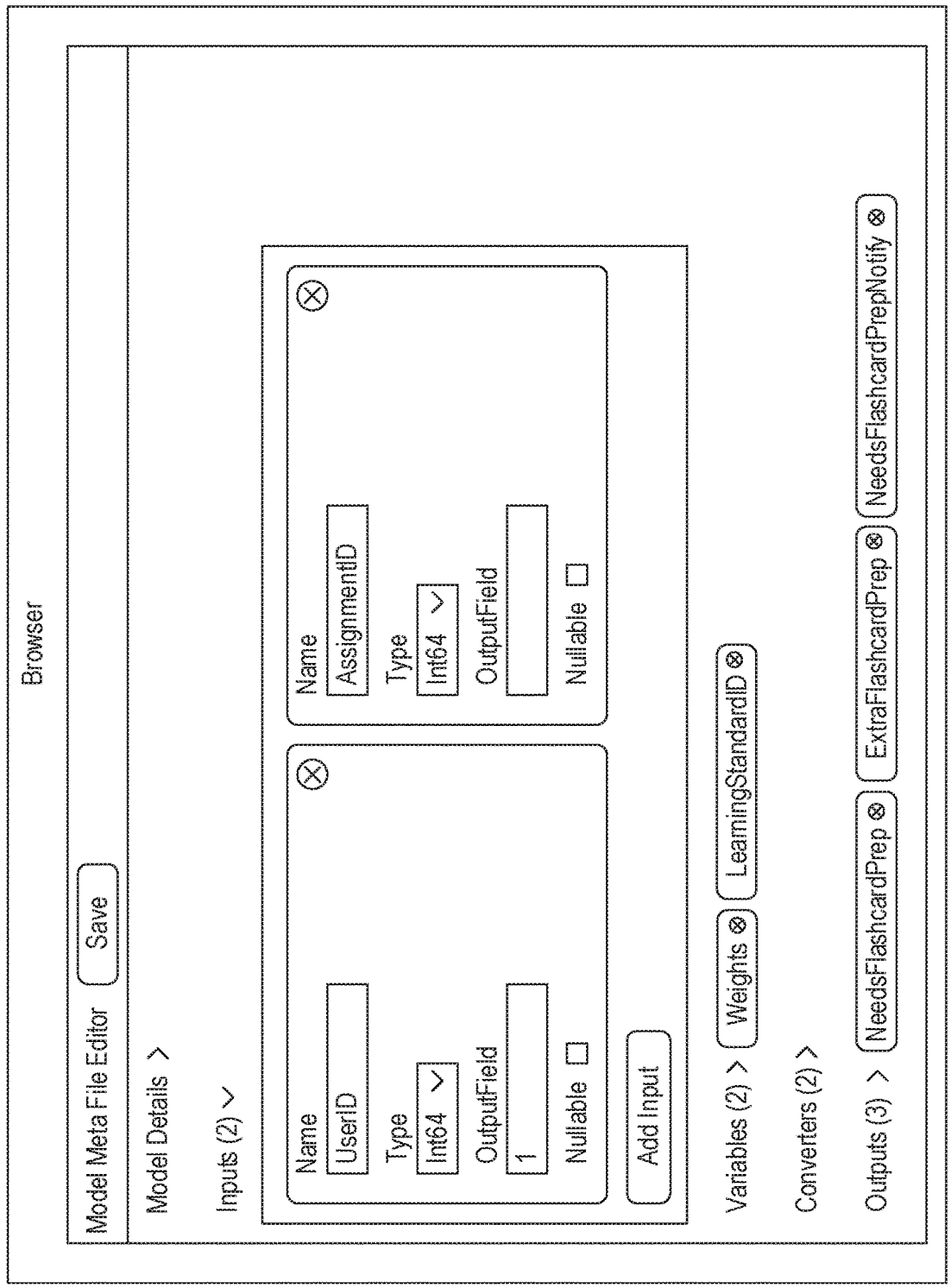

FIG. 3C illustrates the model meta file editor when the Inputs section is expanded. The Inputs section allows the developer of the model meta file to define which input parameter(s) a client process must include in a client request pertaining to the machine learning model with which the model meta file is associated. A model meta file may define zero or more input parameters. As shown in FIG. 3C, for each input parameter, the developer can specify a name, a type, an optional output field and whether the input parameter is nullable. When a value is assigned to an input parameter's output field, the input parameter will also be a parameter in the model request that abstraction system 101 creates for the client request.

FIG. 3D illustrates the model meta file editor when the Variables section is expanded. The Variables section allows the developer of the model meta file to define one or more variables that abstraction system 101 should use when creating model requests and/or for creating output from results of executing the model requests. A model meta file may have zero or more variables. As shown in FIG. 3D, for each variable, the developer can specify a name, a type, an optional initial value, an optional output field and whether the variable is nullable. When a value is assigned to a variable's output field, the variable will also be a parameter in the model request that abstraction system 101 creates for the client request.

Figure 3E:
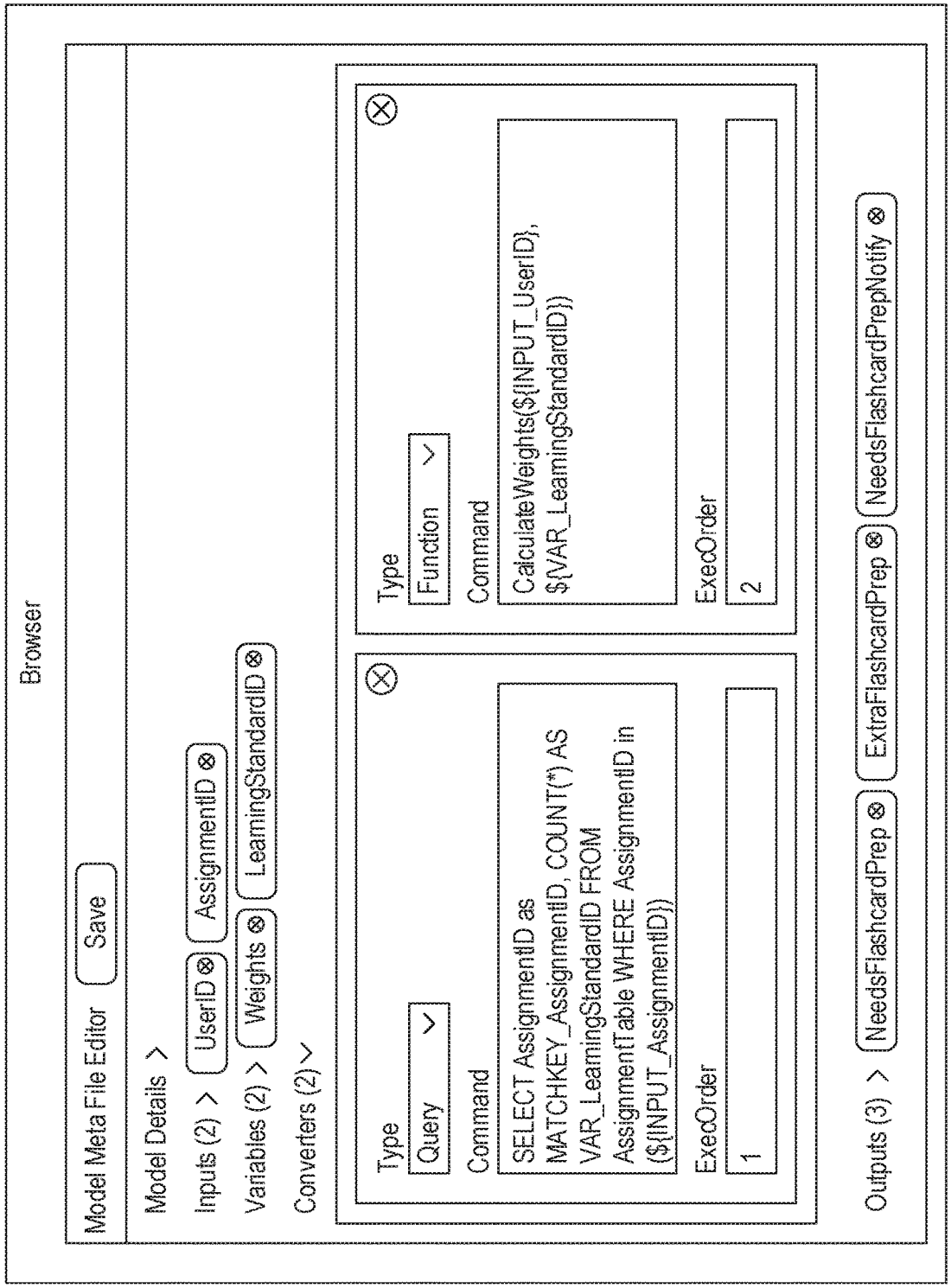

FIG. 3E illustrates the model meta file editor when the Converters section is expanded. The Converters section allows the developer of the model meta file to define one or more convertors that abstraction system 101 should use to prepare and/or aggregate data for the model requests. In general terms, the converters are used to calculate/obtain the values for the variables. A model meta file may have zero or more converters. As shown in FIG. 3E, for each converter, the developer can specify a type (e.g., function or database query), a command which provides the details required by this type of converter (e.g., the function or database query) in order to execute, and an execution order which controls the order in which abstraction system 101 will execute the converters defined in the model meta file.

FIG. 3F illustrates the model meta file editor when the Outputs section is expanded. The Outputs section allows the developer of the model meta file to define one or more outputs that abstraction system 101 should use to determine whether to deliver content when a model request is executed and, if so, how such content should be delivered. A model meta file may have zero or more outputs.

As shown in FIG. 3F, for each output, the developer can specify a name, a channel (e.g., whether the output's content is a "suggestion" to be presented on a webpage, an "enhanced notification" such as an SMS or email, etc.), a title to be displayed with the output's content, a priority for presenting the output's content, an optional identifier of an icon to be displayed with the output's content, to whom the output's content should be delivered, where the output's content should be displayed, any conditions that must be met in order to generate the output's content, the content itself (e.g., any JSON, HTML or Script content to be injected into the client process) and any add-ins that are required for the client process to display the output's content properly. Although the depicted model meta file defines three outputs, only one is shown.

Figure 3G:
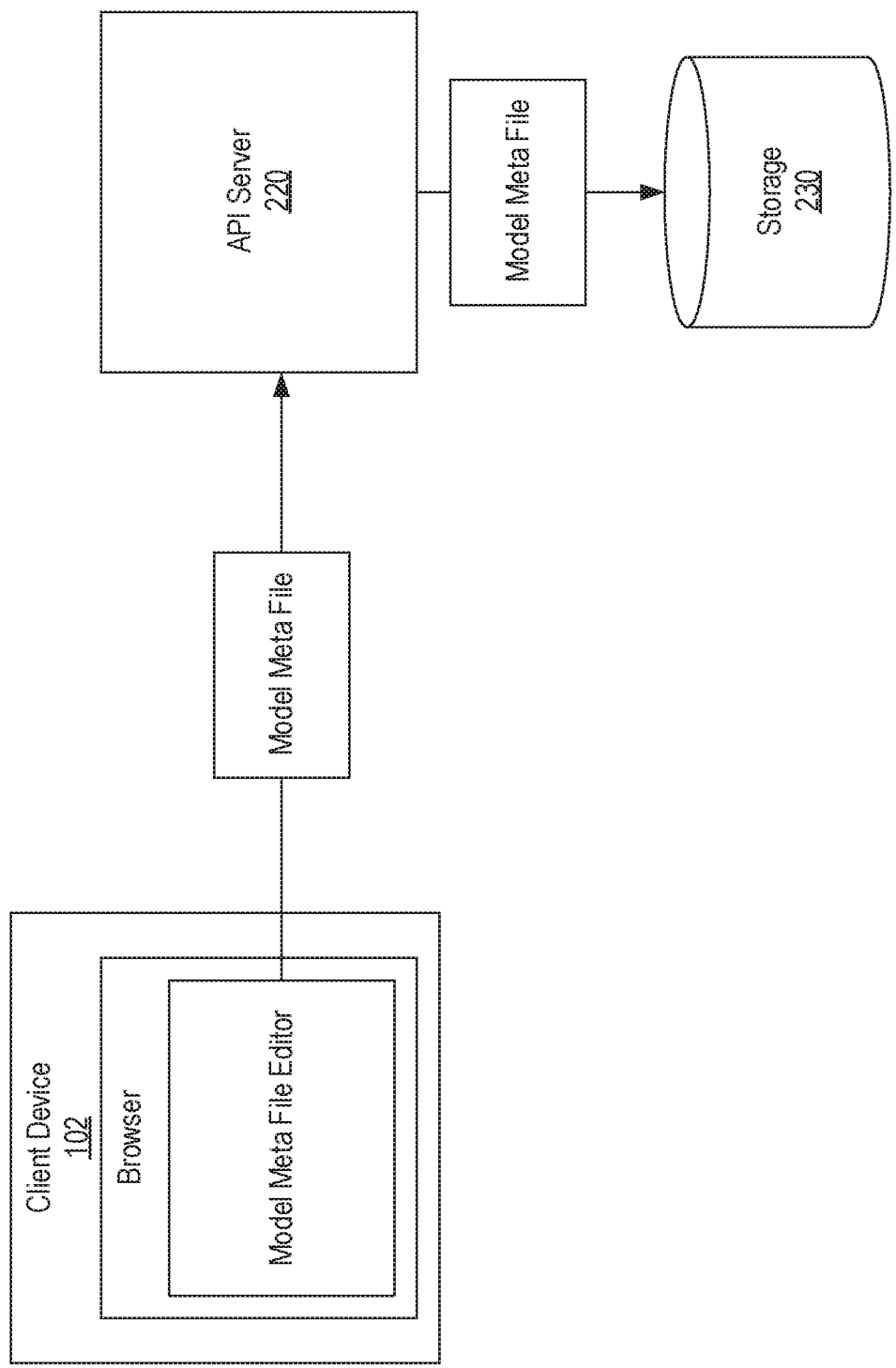

As shown in FIG. 3G, after the developer has input the various types of information, the model meta file editor can send the created/updated model meta file to API server 220 which in turn can store the model meta file in storage 230. In some embodiments, the model meta file can be created by serializing the input (or form data) that the developer provided into key/value pairs or another text-based format that abstraction system 101 can quickly and easily interpret when client requests are subsequently handled. Once a model meta file is created and stored in storage 230, API server 220 can enable the model meta file editor to retrieve, view and edit the model meta file (as well as any other model meta files) including to create new versions of the model meta file.

The following JSON data represents an example model meta file that is largely based on the information shown in FIGS. 3B-3F:

```
{
    "ModelGUID": "ModelGUID1",
    "Name":"Flashcard practice",
    "ExternModelID":"FlashcardPractice",
    "Description":"Auto generate flashcard practice sets for users of an assignment.",
    "Certainty":0,
    "ExpDays":14,
    "Enabled":true,
    "Deleted":false,
    "Inputs":[
        {
            "Name":"UserID",
            "Nullable":false,
            "OutputField":1,
            "Type":"Int64"
        }
        {
            "Name":"AssignmentID",
            "Nullable":false,
            "OutputField":0,
            "Type":"Int64"
        }
    ],
    "Variables": [
        {
            "Name":"Weights",
            "Nullable":false,
            "OutputField":3,
            "Type":"String",
            "Value":""
        },
        {
            "Name":"LearningStandardID",
            "Nullable":false,
            "OutputField":2,
            "Type":"Int32",
            "Value":""
        },
    ]
    "Converters":[
        {
            "Command":"SELECT AssignmentID as
              MATCHKEY_AssignmentID, COUNT(*) AS
              VAR_LearningStandardID FROM AssignmentTable WHERE
              AssignmentID in ($[INPUT_AssignmentID})",
            "ExecOrder":1,
            "Type":"Query"
        },
        {
            "Command":"CalculateWeights(${INPUT_UserID},
              ${VAR_LearningStandardID})",
            "ExecOrder":2,
            "Type":"Function"
        }
    ],
    "Outputs": [
        {
            "Channel":"Suggestion",
            "Conditions":[
                {
                    "LeftSide":"${Outcome}",
```

```
            "Operator":"==",
            "RightSide":"true"
        },
        {
            "LeftSide":"${VAR_Weights}",
            "Operator":"!=",
            "RightSide":""
        }
    ],
    "HTML":"<div class='suggestion langopt-
    en'id='suggestion_${CommonMsgID}'>\n<!-- English version --
    >\n I have some important Flashcards for you. <button
    onclick=\"mlManager.LogML('${CommonMsgID}','Used');startCa
    rds_${CommonMsgID}( )\">Let's
    practice!</button>\n</div>\n<div class='suggestion langopt-es'>\n
    <!-- Spanish version -->\n Tengo algunas tarjetas importantes Para
    TI.<button
    onclick=\"mlManagerLogML('${CommonMsgID}','Used');startCa
    rds_${CommonMsgID}( )\">Let's practice!</button>\n</div>",
    "IconID":1,
    "JSON":"{\n\"Output\": \"NeedsFlashcardPrep\",
    \n\"WeightsJSON\":${VAR_Weights},\n\"LearningStandardID\":
    ${VAR_LearningStandardID},\n}",
    "Name":"NeedsFlashcardPrep",
    "Priority":"h",
    "RequiredAddins":"RedCritter Class Cards",
    "Roles":[
        "Student"
    ],
    "Scopes":[
        "AppDomain/User"
    ],
    "Script":"//Add script here to execute on first load\n\n//Add script to
    run each time suggestion is retrieved on client\nfunction
    onLoad_${CommonMsgID}( ){   \n}\n\n//Add support
    functions\nfunction startCards ${CommonMsgID}( ){\n//var
    jsonObj =
    mlManager.GetSuggestionJSON(\"${CommonMsgID}\");\n if
    (runningAsAddIn){\n\taddIn.assignMLFlashcards('${CommonMsg
    ID}');\n } else {\n\tassignMLFlashcards('${CommonMsgID}');\n
    }\n}",
    "Title":"Let's practice Flashcards!"
},
{
    "Channel":"Suggestion",
    "Conditions":[
        {
            "LeftSide":"${Outcome}",
            "Operator":"==",
            "RightSide":"false"
        },
        {
            "LeftSide":"${VAR_Weights}",
            "Operator":"!=",
            "RightSide":""
        }
    ],
    "HTML":"<div class='suggestion langopt-en'
    id='suggestion_${CommonMsgID}'>\n <!-- English version --
    >\n Would you like to practice Flashcards? <button
    onclick=\"mlManager.LogML('${CommonMsgID}','Used');startCa
    rds_${CommonMsgID}( )\">Let's
    practice!</button>\n</div>\n<div class='suggestion langopt-es'>\n
    <!-- Spanish version -->\n ¿Te gustaria practicar las
    tarjetas?\n<button
    onclick=\"mlManager.LogML('${CommonMsgID}','Used');startCa
    rds_${CommonMsgID}( )\">Let's practice!</button>\n</div>",
    "IconID":2,
    "JSON":"{\n\"Output\": \"ExtraFlashcardPrep\",\n\"WeightsJSON\":
    ${VAR_Weights},\n\"LearningStandardID\":
    ${VAR_LearningStandardID},\n}",
    "Name":"ExtraFlashcardPrep",
    "Priority":"m",
    "RequiredAddins":"RedCritter Class Cards",
    "Roles":[
        "Student"
    ],
    "Scopes":[
        "AppDomain/User"
```

-continued

```
    ],
    "Script":"//Add script here to execute on first load\n\n//Add script to
    run each time suggestion is retrieved on client\nfunction
    onLoad_${CommonMsgID}( ){  \n}\n\n//Add support
    functions\nfunction startCards_${CommonMsgID}( ) {\n//var
    jsonObj =
    mlManager.GetSuggestionJSON(\"${CommonMsgID}\");\n if
    (runningAsAddIn){\n\taddIn.assignMLFlashcards('${CommonMsg
    ID}');\n } else {\n\tassignMLFlashcards('${CommonMsgID}');\n
    }\n}",
    "Title":"Want to practice Flashcards?"
  },
  {
    "Channel":"SMS",
    "Conditions":[
        {
            "LeftSide":"${Outcome}",
            "Operator":"==",
            "RightSide":"true"
        },
        {
            "LeftSide":"${VAR_Weights}",
            "Operator":"!=",
            "RightSide":""
        }
    ],
    "HTML":"--en\nThis is RedCritter -I have some ${AppDomainName}
    flashcards for you to practice\n--es\nEste es RedCritter-tengo
    algunas tarjetas para que practiques",
    "IconID":0,
    "JSON":"",
    "Name":"NeedsFlashcardPrepNotify",
    "Priority":"1",
    "RequiredAddins":"",
    "Roles":[ ],
    "Scopes":[
        "AppDomain/User"
    ],
    "Script":"",
    "Title":""
  }
  ],
}
```

To summarize, a developer can create a model meta file which corresponds to a particular machine learning model that the developer or any other developer may desire to use in a software system. Anyone with sufficient knowledge of the machine learning model could create a model meta file. In some embodiments, the provider of abstraction system 101 could create both the machine learning models and the model meta files for the machine learning models. For example, the provider could create an initial set of model meta files that other developers could view and edit to customize them for use with a particular software system. In any case, the present invention should not be limited by who creates or uses the model meta files.

With a model meta file created for a machine learning model, it is relatively easy to configure a client process to utilize the machine learning model. In particular, the client process need only be configured to submit client requests to API server 220 which identify a particular model meta file (e.g., by specifying the Model GUID for the particular model meta file) and which specify each input that the particular model meta file requires. Abstraction system 101 can then employ the particular model meta file to create and submit a model request and generate and deliver any output from the result(s). Abstraction system 101 hides the complexity of creating and submitting model requests and handling the results so that the developer of the client process need not write custom code for these purposes.

FIGS. 4A-4F represent the functionality that abstraction system 101 performs to enable a client process to utilize a machine learning model by only submitting a client request. In these figures, it will be assumed that a developer has configured a client process to use the same machine learning model "FlashcardPractice" referenced in the example above—i.e., that the developer has developed a client process for presenting flashcards to students and desires to use a machine learning model to select the most relevant flashcards for a particular student based on assignments that are assigned to the student. Notably, the present invention allows the developer to accomplish this without writing custom code for interfacing with a machine learning service or a machine learning model.

Figure 4A:
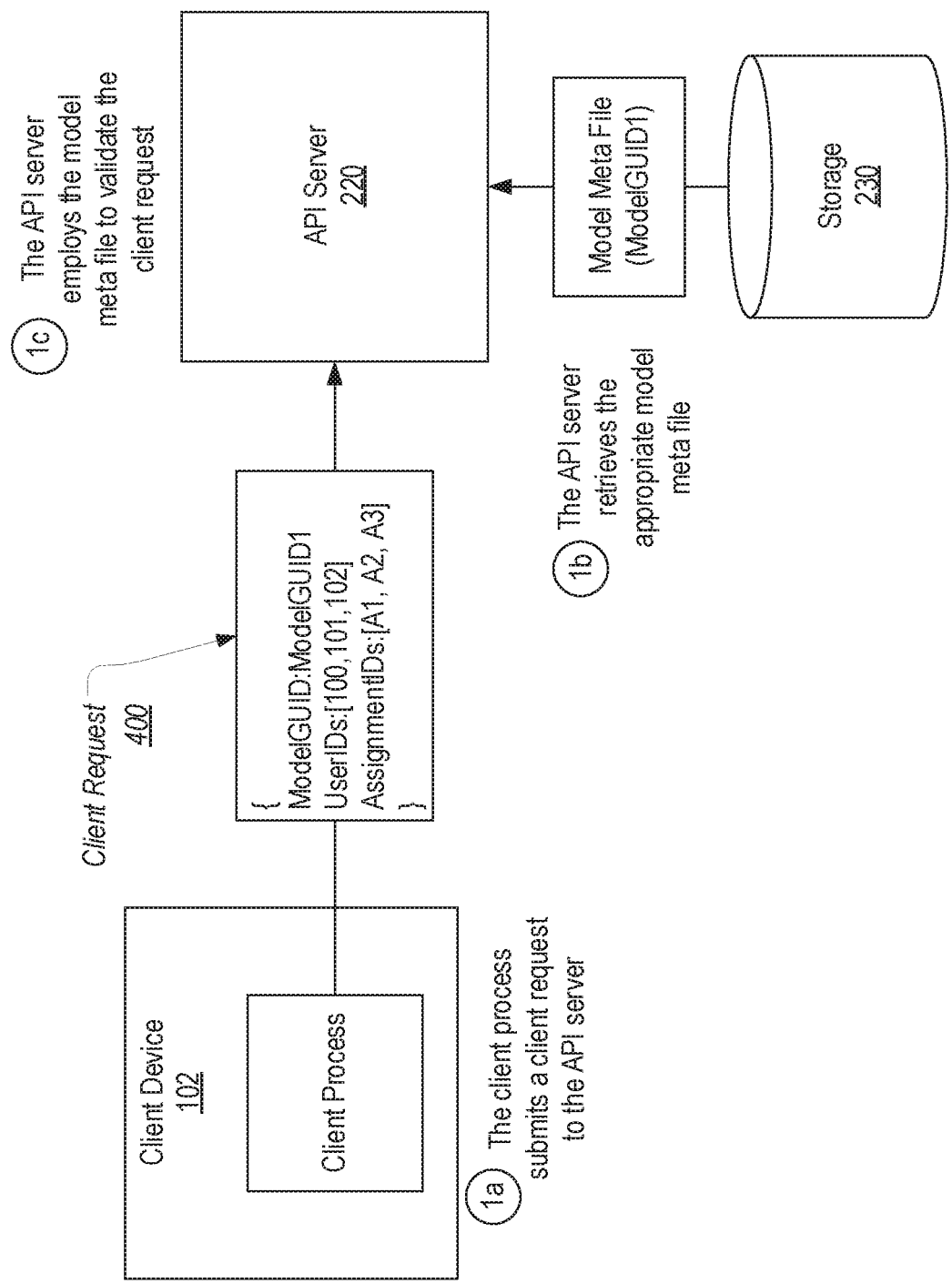

In FIG. 4A, a client process on client device 102 is shown as submitting a client request 400 to API server 220 in step 1a. Because of the functionality that abstraction system 101 performs, the developer will have only needed to develop code to cause the client process to create and send client requests that identify the appropriate model meta file identifier and that provide the required input. Accordingly, in this example, client request 400 specifies a ModelGUID of ModelGUID1, an array of UserIDs and a corresponding array of assignment IDs. As will become apparent below, developing code to create client request 400 is much simpler than developing code to interface directly with a machine learning service to employ a machine learning model.

It is noted that API server 220 can allow a client request to include a single value for each input parameter or multiple values for each input parameter. In the depicted example, the model meta file requires two input parameters (UserID and AssignmentID) and therefore client request 400 includes an array of UserIDs ([100, 101, 102]) and an array of AssignmentIDs ([A1, A2, A3]) which indicates that three different assignments have been assigned to three different students.

In step 1*b*, in response to receiving client request 400, API server 220 can employ the ModelGUID defined in client request 400 to retrieve the appropriate model meta file from storage 230 (i.e., the model meta file having a ModelGUID of ModelGUID1). Then, in step 1*c*, API server 220 can validate client request 400. This validation can include determining whether client request 400 includes the input parameter(s) that the model meta file requires. In the case where the client request includes multiple values for multiple input parameters, the validation can include determining whether the values for the input parameters are presented in parallel arrays (i.e., the arrays have the same number of elements). With reference to the depicted example, API server 220 can determine whether client request 400 includes the same number of UserIDs and AssignmentIDs. At this step, API server 220 may also perform some type of authentication to ensure that the client process is authorized to submit client request 400.

Figure 4B:
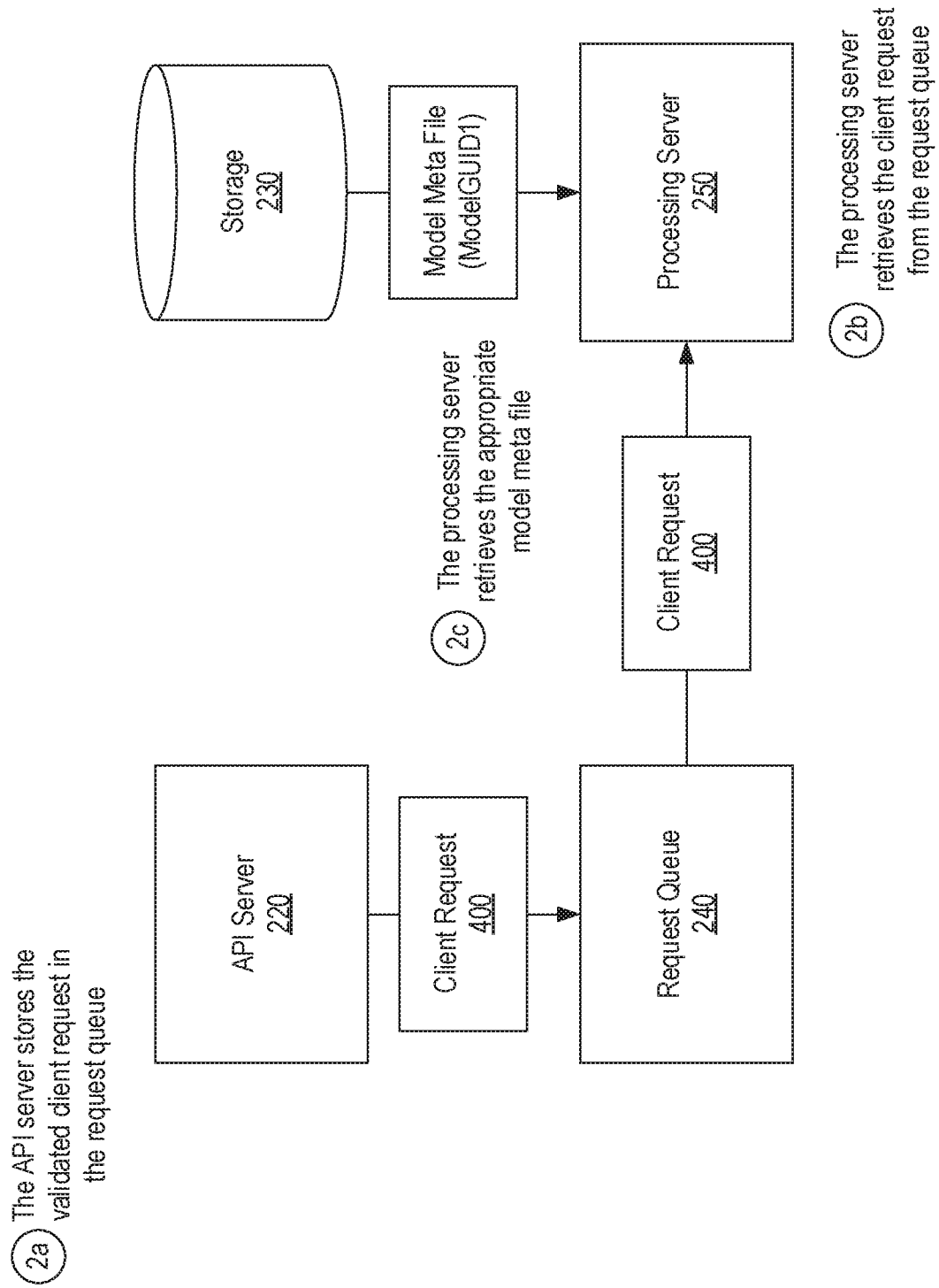

As represented as step 2*a* in FIG. 4B, after validating client request 400, API server 220 stores client request 400 in request queue 240. Request queue 240, which is an optional component, facilitates the asynchronous handling of client requests. For example, by employing request queue 240, a separate back-end server (e.g., processing server 250) rather than API server 220 can process the client requests. Request queue 240 also facilitates scaling since API server 220 may receive client requests more quickly than they can be processed. In step 2*b*, processing server 250 retrieves client request 400 from request queue 240. Then, in step 2*c*, processing server 250 retrieves the appropriate model meta file from storage 230. This can again be accomplished by identifying the ModelGUID defined in client request 400 and using this ModelGUID to retrieve the model meta file having the same ModelGUID.

Figure 4C:
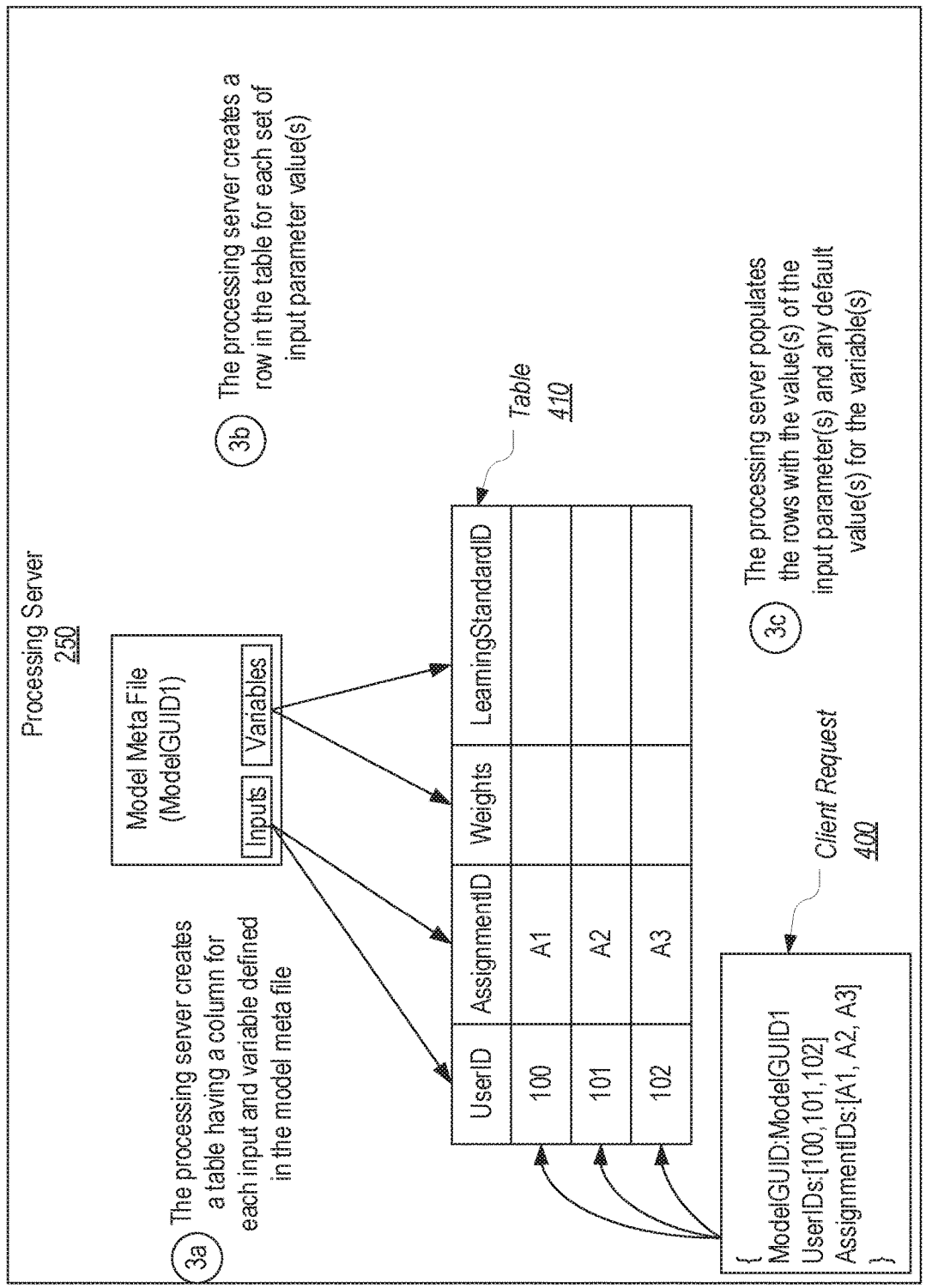
Figure 4D:
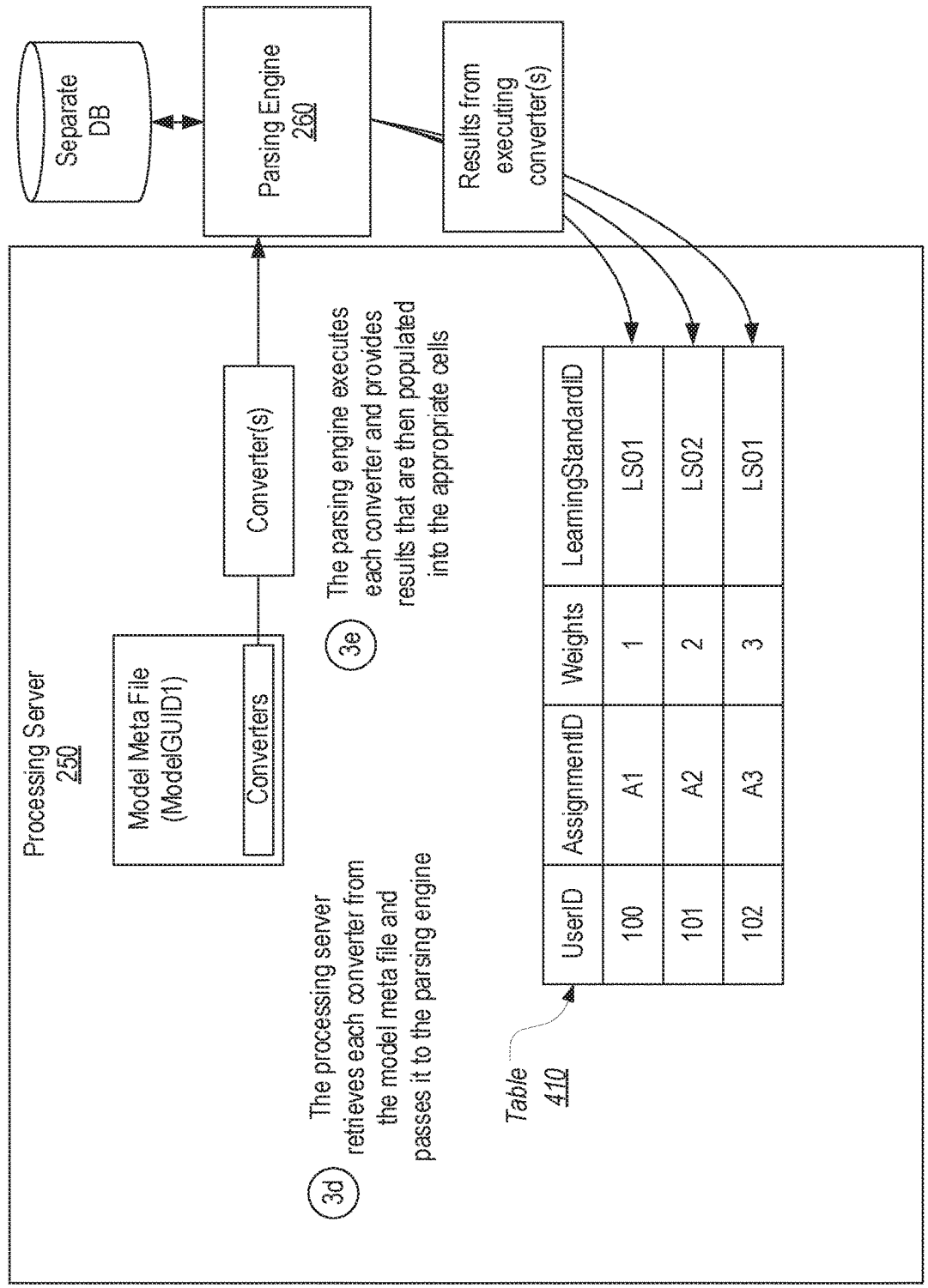
Figure 4E:
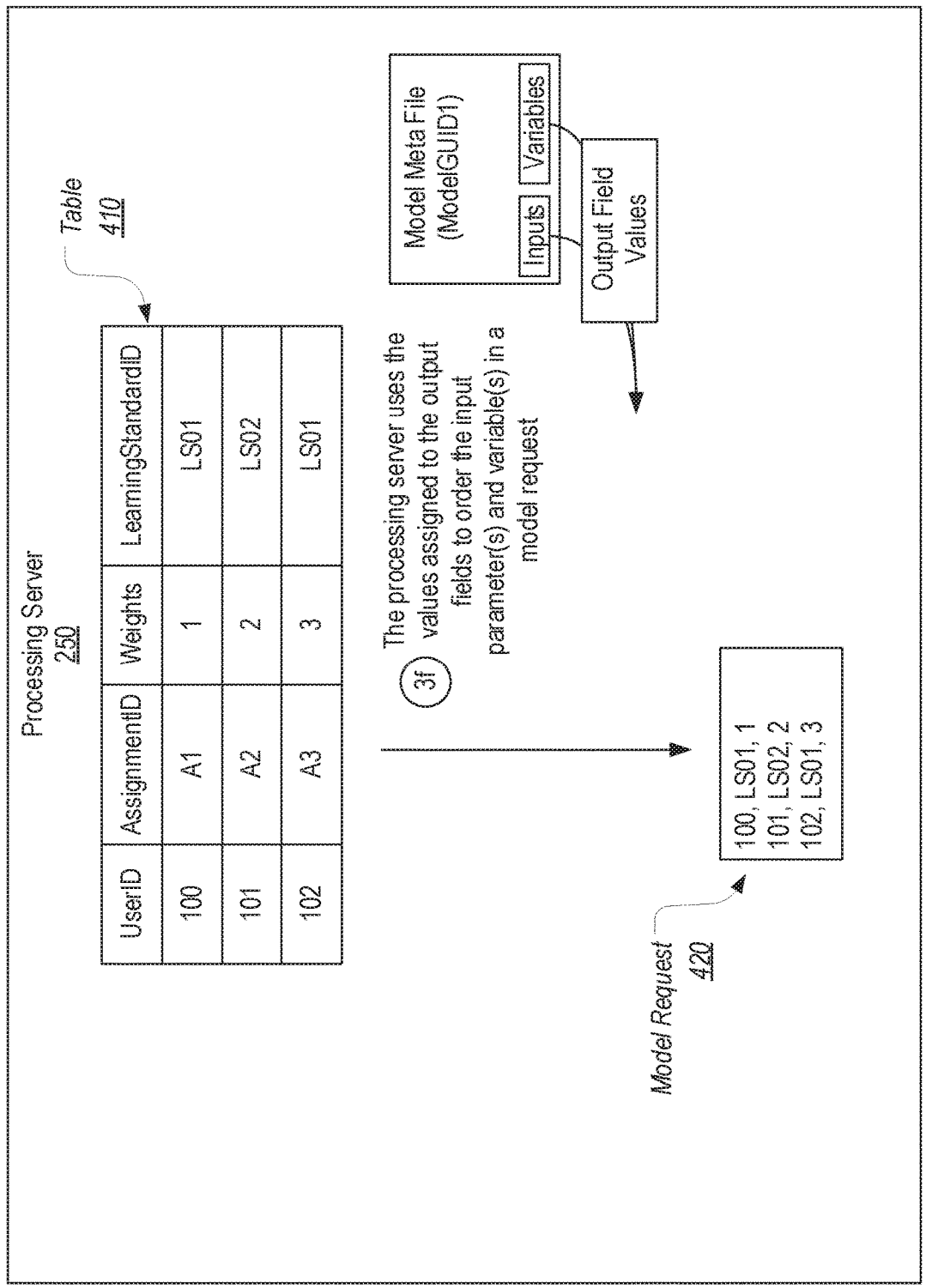

FIGS. 4C-4E represent how processing server 250 employs the model meta file to create model request(s) from a client request. In step 3*a* shown in FIG. 4C, processing server 250 creates a data structure having a row and column format (e.g., a table) in memory. Processing server 250 creates a column for each input parameter and variable defined in the model meta file. In the depicted example, processing server 250 has created a table 410 having four columns—a column for each of the UserID and AssignmentID input parameters and a column for each of the Weights and LearningStandardID variables. In step 3*b*, processing server 250 creates a number of rows equal to the number of values provided in the client request for each input parameter. In the depicted example, because client request 400 includes three values for the UserID and AssignmentID input parameters, processing server 250 will create three rows. In step 3*c*, processing server 250 will populate the row(s) using the value(s) of the input parameter(s) defined in the client request and any default values defined for the variables. In the depicted example, processing server 250 has added the UserIDs 100, 101 and 102 in the UserID column and the AssignmentIDs A1, A2 and A3 in the AssignmentID column of the respective row. Since the model meta file does not provide default values for any of the variables, the remaining columns are shown as remaining blank.

In step 3*d* shown in FIG. 4D, processing server 250 retrieves each converter defined in the model meta file and passes it to parsing engine 260 (which may be a component of processing server 250). In step 3*e*, parsing engine 260 processes the command defined in each converter to create an executable database query or function. For example, parsing engine 260 can replace the placeholder ${INPUT_AssignmentID} with the actual AssignmentIDs contained in table 410. Parsing engine 260 then executes each command to retrieve/modify the value(s) of variable(s). In the depicted example, one of the defined converters is a database query that retrieves the value for the LearningStandardID variable using the AssignmentID input parameter. For example, it can be assumed that each assignment is associated with a learning standard (e.g., a particular section of the Common Core) and that this converter is used to obtain the identifier of the learning standard for the assignment that has been assigned to the students. In this example, it will be assumed that the database query defined in the converter returns LearningStandardIDs of LS01, LS02 and LS01 for AssignmentIDs A1, A2, and A3 respectively and therefore LS01, LS02 and LS01 are shown as being populated into the respective rows of table 410.

Also, in the depicted example, the other defined converter is a function named "CalculateWeights." It is assumed that this function is implemented on abstraction system 101 and takes the UserID input parameter values and the LearningStandardID variable values as input and calculates the values of the weight variable (which are assumed to be 1, 2 and 3 respectively). Accordingly, after step 3*e*, table 410 is shown as having each of the rows being fully populated. As mentioned above, abstraction system 101 can allow many different types of converters of varying complexity to be used by a model meta file. The CalculateWeights converter is a simplified example for illustrative purposes only. A function-type converter can employ any number and type of inputs, any number and type of information that may be accessible to parsing engine 260 (including the results of executing other converters) and may generate any number and type of outputs. Of importance is the fact that the developer of the client process does not need to be aware of which converters are used or what the converters do, but only needs to supply the proper input parameters within the client request.

Finally, in step 3*f* shown in FIG. 4E, processing server 250 creates a model request 420 from table 410. Machine learning services typically require model requests to be in the form of comma separated values. In addition to converting the content of table 410 into CSV format, processing server 250 can also order the values in the CSV formatted model request 420 to match the targeted machine learning model. This is accomplished using the output field of each input parameter and variable. In other words, the output field of Inputs and Variables in the model meta file dictates the ordering of the values in a model request. In the depicted example, the UserID input parameter has an output field set to 1, the LearningStandardID variable has an output field set to 2 and the Weights variable has an output field set to 3. Processing server 250 can therefore place the UserID first in model request 420, then the LearningStandardID, followed by the Weights value. The AssignmentID input parameter's output field is not set in the model meta file and therefore, processing server 250 does not include the AssignmentID in model request 420.

It is noted that the CSV format is just one example and represents the format that is currently employed by the commonly-used machine learning services. If a machine learning service required a different format for model requests, processing server 250 could be configured to create model requests in that required format. The present invention should therefore not be limited to any particular format for model requests. Of importance is the fact that the model meta file enables processing server 250 to create appropriately formatted model requests from client requests.

Figure 4F:
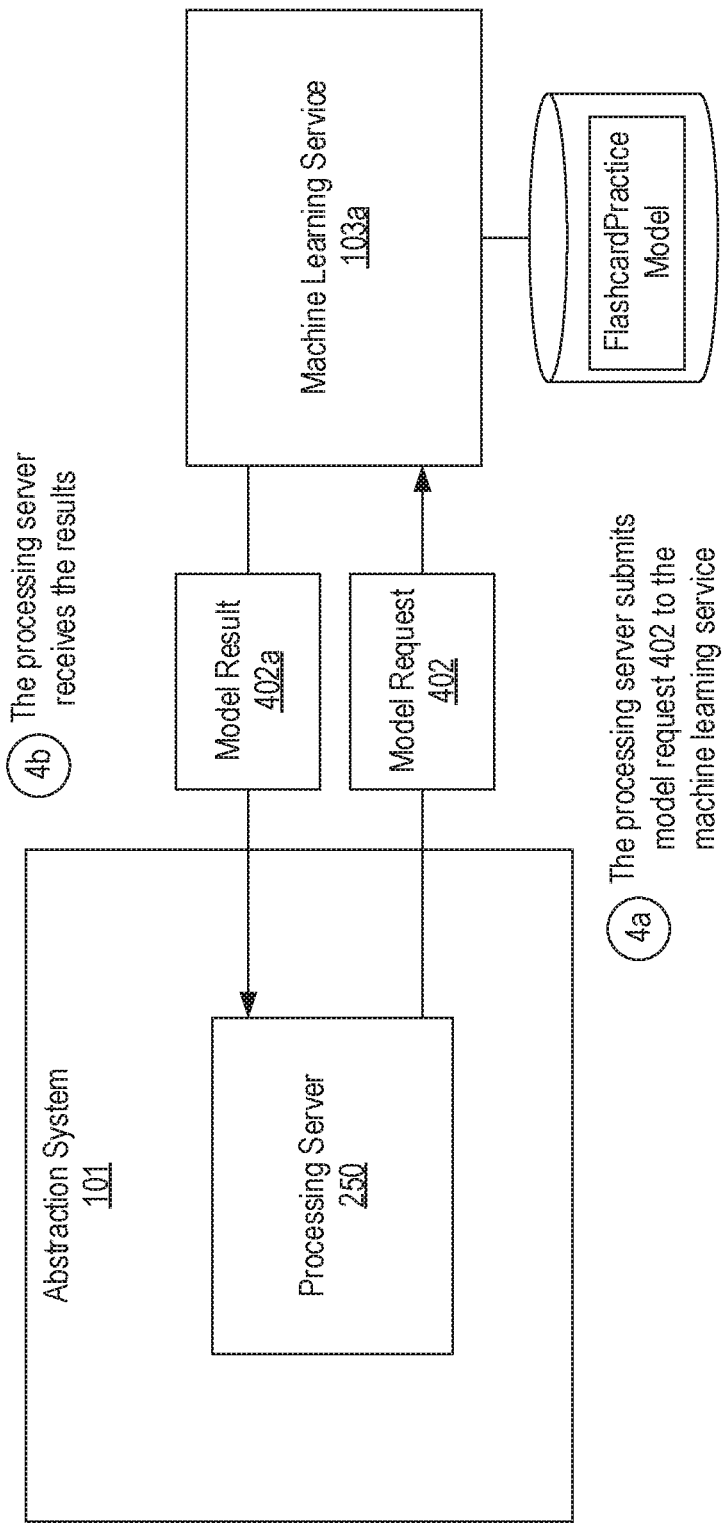

In step 4*a* shown in FIG. 4F, processing server 250 submits model request 402 to the appropriate machine learning service which is assumed to be machine learning service 103*a*. Although not shown, model request 402 can be configured to identify the targeted machine learning model (FlashcardPractice). For example, processing server 250 could extract the name of the machine learning model from the model meta file and include it in/with model request 402. In step 4*b*, processing server 250 can receive or otherwise obtain model result 402*a* which represents the results of processing model request 402 against the machine learning model. Processing server 250 can obtain model result 402*a* in any suitable manner. For example, processing server 250 may periodically scan a cloud-based file directory to detect when a file containing model result 402*a* has been created, can wait for a push notification, etc.

Figure 4G:
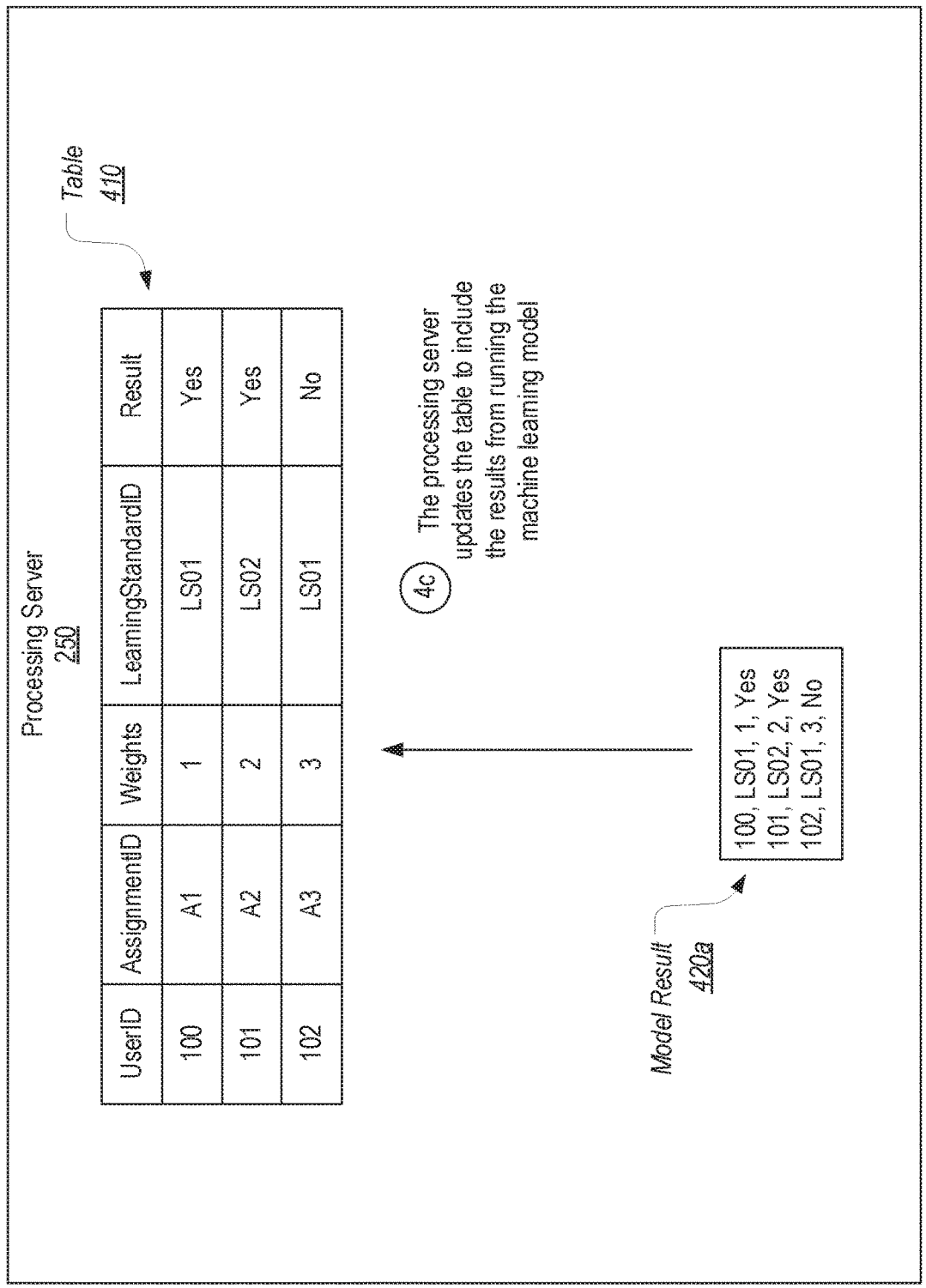

In the depicted example, it is assumed that the FlashcardPractice machine learning model predicts whether the student needs more practice on the identified learning standard section using the weights value. For example, the weights value can represent the depth at which the learning standard is covered in the assignment, and the FlashcardPractice machine learning model can be configured to predict a student's success on a particular learning standard section based on the student's (and possibly other students') past performance. As shown in FIG. 4G, it is assumed that model result 420*a* indicates that the students with UserID 100 and 101 need more practice while the student with UserID 102 does not. Accordingly, in step 4*c*, processing server 250 can update table 410 (or create a new table) to include the results of running the FlashcardPractice machine learning model on model request 420.

Figure 4H:
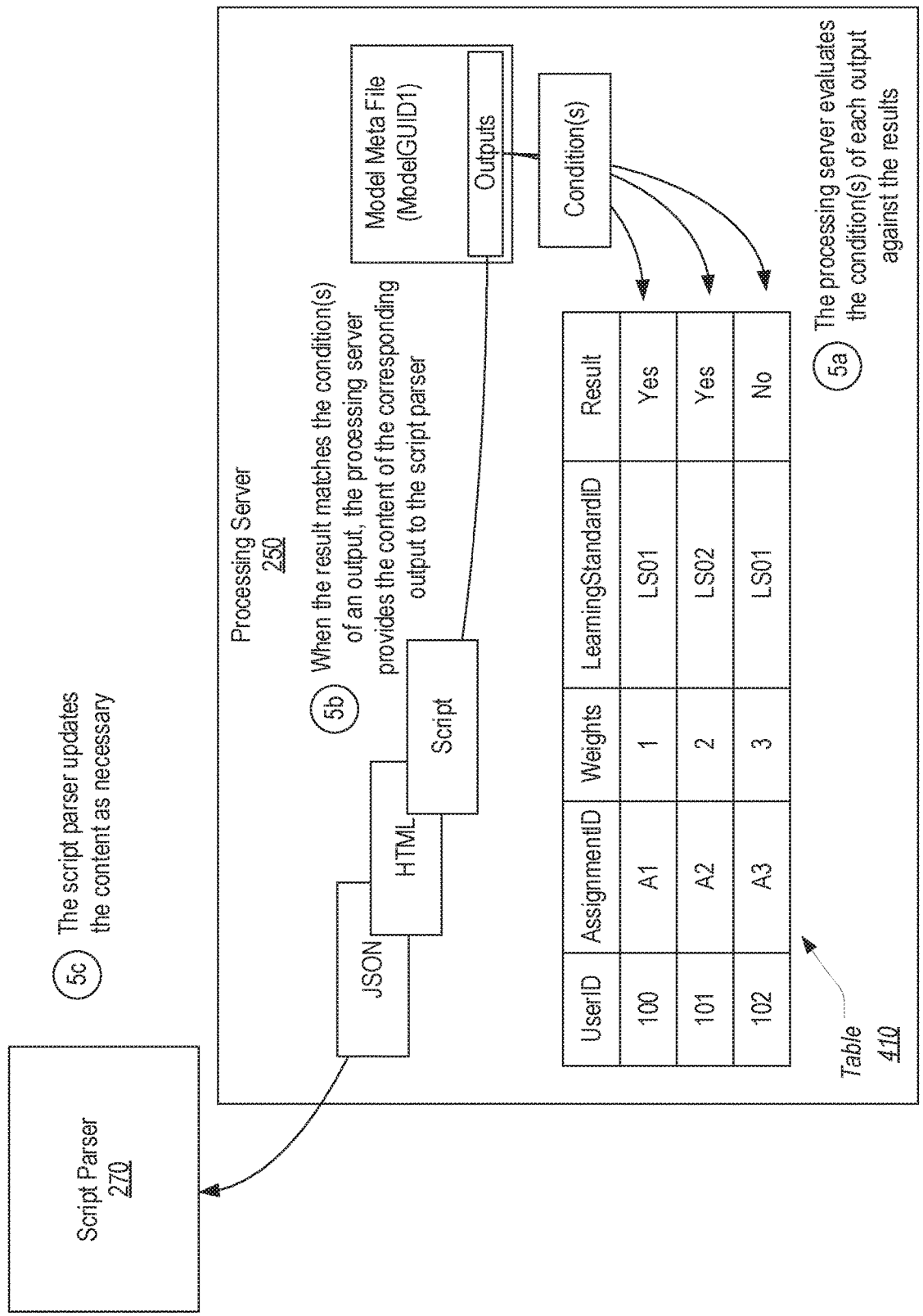

Once the results are obtained from the machine learning service, processing server 250 can then evaluate the conditions defined in the model meta file against the results. As represented in step 5*a* shown in FIG. 4H, processing server 250 can access each output defined in the model meta file to determine whether a particular row in table 410 matches each condition defined in the output. For example, the NeedsFlashcardPrep output and the NeedsFlashcardPrepNotify output both define two conditions: (1) the machine learning model result (or ${Outcome}) must be true and (2) the Weights value must not be null. The rows in table 410 for UserID 100 and 101 both meet these conditions. Accordingly, processing server 250 will determine that these two rows should cause the content defined in the NeedsFlashcardPrep output and the NeedsFlashcardPrepNotify output to be delivered in the defined manner. In contrast, the ExtraFlashcardPrep output defines two conditions: (1) the machine learning model result must not be true and (2) the Weights value must not be null. The row in table 410 for UserID 102 meets these conditions. Accordingly, processing server 250 will determine that this row should cause the content defined in the ExtraFlashcardPrep output to be delivered in the defined manner.

To cause the content of each output to be delivered in the defined manner, processing server 250 can relay the content (e.g., the JSON, HTML and/or Script content) to script parser 270 in step 5*b*. Then, in step 5*c*, script parser 270 can update/modify the content as appropriate. For example, the JSON content defined in the NeedsFlashcardPrep output includes the Weights variable and the LearningStandardID variable. Script parser 270 can employ table 410 to replace the variable placeholders in this JSON with the actual variable values.

Finally, in step 6 shown in FIG. 4I, abstraction system 101 can deliver the content of the output(s) in the defined manner. For example, content of outputs having a channel type of "suggestion" can be delivered to the client process for injection into the client process. Content of outputs having a channel type of "SMS" may be delivered directly to the corresponding end user (e.g., by sending a text message containing the defined HTML content to the students having the UserIDs of 100 and 101). Alternatively, such content could be delivered to the client process which may then deliver the content to the end user.

Because the model meta file defines the content (e.g., JSON, HTML, script, etc.) of the output, the developer will not need to develop custom code to handle the results of the machine learning model. In contrast, the developer will only need to develop code for receiving and injecting the content. When the client process is a browser-based solution, the content can simply be added to a webpage for the corresponding end user (e.g., the student that was predicted to need flashcard practice).

In summary, abstraction system 101 hides the complexity of using a machine learning model from the developer of client processes. The developer will only need to write code for submitting client requests to API server 220 and code for receiving the JSON, HTML, and/or script content that API server 220 may return in response. If the developer desires to use a different machine learning service/model with the client process, the developer will not need to write entirely new code that is specific to the different machine learning service/model, but will only need to modify the format of the client request. The present invention therefore enables the developer to focus on other components and features of a client process while still being able to easily and quickly utilize virtually any machine learning model.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by an abstraction system, for enabling a developer to create a model meta file for a machine learning model that predicts whether a student needs more practice on subject matter that is covered in an assignment that has been assigned to the student to thereby enable a client process on a client device to integrate the machine learning model using the model meta file, the method comprising:
   maintaining a model meta file storage that stores a plurality of model meta files, each model meta file corresponding with a particular machine learning model, each model meta file defining zero or more input parameters, zero or more variables, zero or more converters and zero or more outputs;
   presenting, to a developer via a developer client device, a model meta file editor that is configured to enable the developer to create a model meta file for a particular machine learning model;
   receiving, via the model meta file editor, developer input that requests creation of a first model meta file and associates the first model meta file with a first machine learning model that predicts whether a student needs more practice on subject matter that is covered in an assignment that has been assigned to the student;
   receiving, via the model meta file editor, developer input that defines, for the first model meta file, a student identifier input parameter and an assignment identifier input parameter that a client process must include in a client request pertaining to the first machine learning model;
   receiving, via the model meta file editor, developer input that defines, for the first model meta file, a weights variable and a learning standard variable that the abstraction system is to use when creating model requests using the first model meta file or for creating output from results of executing model requests that were created using the first model meta file;
   receiving, via the model meta file editor, developer input that defines, for the first model meta file, a first converter and a second converter that the abstraction system is to use to prepare or aggregate data for model requests created using the first model meta file;
   receiving, via the model meta file editor, developer input that defines, for the first model meta file, a first output that the abstraction system is to use to determine whether to deliver content when model requests created using the first model meta file are executed and, if so, how the content is to be delivered, the first output defining one or more conditions;
   in response to the developer input, storing the first model meta file in the model meta file store to thereby allow a client process that is part of a software system executing on a different client device to use the first model meta file to integrate the first machine learning model into the software system;
   receiving, from the client process, a first client request that identifies the first model meta file and includes a value for the student identifier input parameter and a value for the assignment identifier input parameter;
   accessing the model meta file storage to retrieve the first model meta file;
   using the first model meta file to create a first model request by:
      obtaining the first converter and the second converter from the first model meta file;
      executing a command in the first converter using the value for the assignment identifier input parameter to obtain a value for the learning standard variable;
      executing a command in the second converter using the value for the student identifier input parameter and the value for the learning standard variable to obtain a value for the weights variable; and
      associating the value for the learning standard variable and the value for the weights variable with the value for the student identifier input parameter and the value for the assignment identifier input parameter;
   submitting the first model request having the value for the learning standard variable and the value for the weights variable associated with the value for the student identifier input parameter and the assignment identifier input parameter to a first machine learning service to cause the first machine learning service to evaluate the first model request against the first machine learning model;
   obtaining a first model result from the evaluation of the first model request;
   comparing the first model result to the one or more conditions of the first output defined in the first model meta file; and
   upon determining that the first model result matches the one or more conditions of the first output, delivering content of the first output to the client process.

2. The method of claim 1, further comprising:
   validating the first client request prior to creating the first model request by determining that the first client request includes the value for the student identifier input parameter and the assignment identifier input parameter.

3. The method of claim 1, wherein the first client request identifies the first model meta file of the plurality of model meta files by including an identifier of the first model meta file.

4. The method of claim 1, wherein the first model meta file defines one or more additional input parameters and the first client request includes a value for each of the one or more additional input parameters, and wherein using the first model meta file to create the first model request comprises including, in the first model request, the value for the one or more additional input parameters.

5. The method of claim 4, wherein the first model meta file defines an output field for each of the one or more additional input parameters, and wherein including, in the first model request, the value for the one or more additional input parameters comprises positioning, in the first model request, the value for the one or more additional input parameters based on the output field defined in the first model meta file for the one or more additional input parameters.

6. The method of claim 4, wherein the first model meta file defines one or more additional variables, and wherein using the first model meta file to create the first model request comprises including, in the first model request, a value for the one or more additional variables.

7. The method of claim 6, wherein the first model meta file defines an output field for each of the one or more additional input parameters and the one or more additional variables, and wherein including, in the first model request, the value for the one or more additional input parameters and the value for the one or more additional variables comprises:
positioning, in the first model request, the value for the one or more additional input parameters based on the output field defined in the first model meta file for the one or more additional input parameters; and
positioning, in the first model request, the value for the one or more additional variables based on the output field defined in the first model meta file for the one or more additional variables.

8. The method of claim 1, wherein the first client request includes multiple values for the student identifier input parameter and multiple values for the assignment identifier input parameter, wherein the command in the first converter is executed using each of the multiple values for the assignment identifier input parameter to obtain a corresponding value for the learning standard variable and the corresponding value for the learning standard variable is associated with the corresponding value for the assignment identifier input parameter, and wherein the command in the second converter is executed using each of the multiple values for the student identifier input parameter and the corresponding value for the learning standard variable to obtain a corresponding value for the weights variable and the corresponding value for the weights variable is associated with the corresponding values for the student identifier input parameter, assignment identifier input parameter and learning standard variable.

9. The method of claim 1, wherein the command is one of a database query or a function.

10. The method of claim 8, wherein the associated values for the student identifier input parameter, the assignment identifier input parameter, the weights variable and the learning standard variable are sorted based on an order defined in the first model meta file.

11. The method of claim 1, wherein delivering content of the first output to the client process comprises delivering one or more of JSON content, HTML content or script content to the client process.

12. The method of claim 1, further comprising:
receiving, from the client process, a second client request that identifies a second model meta file of the plurality of model meta files, the second model meta file corresponding with a second machine learning model;
accessing the model meta file storage to retrieve the second model meta file;
using the second model meta file to create a second model request;
submitting the second model request to either the first machine learning service or a second machine learning service to cause the first or second machine learning service to evaluate the second model request against the second machine learning model;
obtaining a second model result from the evaluation of the second model request;
comparing the second model result to one or more conditions of a second output defined in the second model meta file; and
upon determining that the second model result matches the one or more conditions of the second output, delivering content of the second output to the client process.

13. The method of claim 8, wherein associating the value for the learning standard variable and the value for the weights variable with the value for the student identifier input parameter and the value for the assignment identifier input parameter comprises:
creating a table that includes a column for each of the student identifier input parameter, the assignment identifier input parameter, the weights variable, and the learning standard variable and that includes a row for each value for the student identifier input parameter contained in the first client request.

14. A computer storage media storing computer executable instructions which when executed implement a method for enabling a developer to create a model meta file for a machine learning model that predicts whether a student needs more practice on subject matter that is covered in an assignment that has been assigned to the student to thereby enable a client process on a client device to integrate the machine learning model using the model meta file, the method comprising:
maintaining a model meta file storage that stores a plurality of model meta files, each model meta file corresponding with a particular machine learning model, each model meta file defining zero or more input parameters. zero or more variables, zero or more converters and zero or more outputs;
presenting, to a developer via a developer client device, a model meta file editor that is configured to enable the developer to create a model meta file for a particular machine learning model;
receiving, via the model meta file editor, developer input that requests creation of a first model meta file and associates the first model meta file with a first machine learning model that predicts whether a student needs more practice on subject matter that is covered in an assignment that has been assigned to the student;
receiving, via the model meta file editor, developer input that defines, for the first model meta file, a student identifier input parameter and an assignment identifier input parameter that a client process must include in a client request pertaining to the first machine learning model;
receiving, via the model meta file editor, developer input that defines, for the first model meta file, a weights variable and a learning standard variable that the abstraction system is to use when creating model requests using the first model meta file or for creating output from results of executing model requests that were created using the first model meta file;

receiving, via the model meta file editor, developer input that defines, for the first model meta file, a first converter and a second converter that the abstraction system is to use to prepare or aggregate data for model requests created using the first model meta file;

receiving, via the model meta file editor, developer input that defines, for the first model meta file, a first output that the abstraction system is to use to determine whether to deliver content when model requests created using the first model meta file are executed and, if so, how the content is to be delivered, the first output defining one or more conditions;

in response to the developer input, storing the first model meta file in the model meta file store to thereby allow a client process that is part of a software system executing on a different client device to use the first model meta file to integrate the first machine learning model into the software system;

receiving, from the client process, a first client request that identifies the first model meta file and includes a value for the student identifier input parameter and a value for the assignment identifier input parameter;

accessing the model meta file storage to retrieve the first model meta file;

using the first model meta file to create a first model request by:
  obtaining the first converter and the second converter from the first model meta file;
  executing a command in the first converter using the value for the assignment identifier input parameter to obtain a value for the learning standard variable;
  executing a command in the second converter using the value for the student identifier input parameter and the value for the learning standard variable to obtain a value for the weights variable; and
  associating the value for the learning standard variable and the value for the weights variable with the value for the student identifier input parameter and the value for the assignment identifier input parameter;

submitting the first model request having the value for the learning standard variable and the value for the weights variable associated with the value for the student identifier input parameter and the assignment identifier input parameter to a first machine learning service to cause the first machine learning service to evaluate the first model request against the first machine learning model;

obtaining a first model result from the evaluation of the first model request;

comparing the first model result to the one or more conditions of the first output defined in the first model meta file; and upon determining that the first model result matches the one or more conditions of the first output, delivering content of the first output to the client process.

15. The computer storage media of claim 14, further comprising:
  validating the first client request prior to creating the first model request by determining that the first client request includes the value for the student identifier input parameter and the assignment identifier input parameter.

16. The computer storage media of claim 14, wherein the first client request identifies the first model meta file of the plurality of model meta files by including an identifier of the first model meta file.

17. The computer storage media of claim 14, wherein the first model meta file defines one or more additional input parameters and the first client request includes a value for each of the one or more additional input parameters, and wherein using the first model meta file to create the first model request comprises including, in the first model request, the value for the one or more additional input parameters.

18. The computer storage media of claim 14, wherein the first model meta file defines an output field for each of the one or more additional input parameters, and wherein including, in the first model request, the value for the one or more additional input parameters comprises positioning, in the first model request, the value for the one or more additional input parameters based on the output field defined in the first model meta file for the one or more additional input parameters.

19. The computer storage media of claim 14, wherein the first model meta file defines one or more additional variables, and wherein using the first model meta file to create the first model request comprises including, in the first model request, a value for the one or more additional variables.

20. The computer storage media of claim 14, wherein the first model meta file defines an output field for each of the one or more additional input parameters and the one or more additional variables, and wherein including, in the first model request, the value for the one or more additional input parameters and the value for the one or more additional variables comprises:
  positioning, in the first model request, the value for the one or more additional input parameters based on the output field defined in the first model meta file for the one or more additional input parameters; and
  positioning, in the first model request, the value for the one or more additional variables based on the output field defined in the first model meta file for the one or more additional variables.

* * * * *